Nov. 20, 1945.  H. M. GRIFFOUL  2,389,307
MAGNESIUM MELTING FURNACE
Filed May 13, 1944  3 Sheets-Sheet 1

INVENTOR
Henry M. Griffoul
By [signature]
ATTY

Nov. 20, 1945.  H. M. GRIFFOUL  2,389,307
MAGNESIUM MELTING FURNACE
Filed May 13, 1944  3 Sheets-Sheet 2

INVENTOR
Henry M. Griffoul
BY John A. Naismith
ATTY

Nov. 20, 1945.   H. M. GRIFFOUL   2,389,307
MAGNESIUM MELTING FURNACE
Filed May 13, 1944   3 Sheets-Sheet 3

INVENTOR
Henry M. Griffoul
BY John A. Naismith
ATT'Y

Patented Nov. 20, 1945

2,389,307

UNITED STATES PATENT OFFICE 2,389,307

MAGNESIUM MELTING FURNACE

Henry M. Griffoul, San Jose, Calif.

Application May 13, 1944, Serial No. 535,525

3 Claims. (Cl. 263—22)

Reference is made to my copending application filed October 14, 1942, Serial No. 462,045, for Furnaces.

While the present invention relates particularly to magnesium melting furnaces, it is equally useful for the melting of metals for the forming of ingots or alloys, and more particularly for melting or refining non-ferrous metals of the type that oxidize rapidly when exposed to the air.

It is one object of my invention to provide a furnace of the character indicated whereby metals of the type indicated may be mixed or purified with the minimum use of flux.

It is another object to provide a furnace so constructed and arranged that metals of widely varying specific gravity may be thoroughly mixed to form a homogeneous alloy.

It is still another object of the invention to provide a furnace of the character indicated whereby the metal may be melted by the application of heat throughout its entire mass, and wherein the metallic mass is kept in motion during the melting process and the melting thereby speeded up.

Finally, it is an object of the invention to provide a furnace of the character indicated wherein the air in the furnace may be replaced with an inert gas during the melting process; wherein a rotary or rocking movement may be imparted to the melting pot; that will be economical to manufacture, quickly and easily charged and emptied, easily repaired and highly efficient in its practical application.

Figure 1:
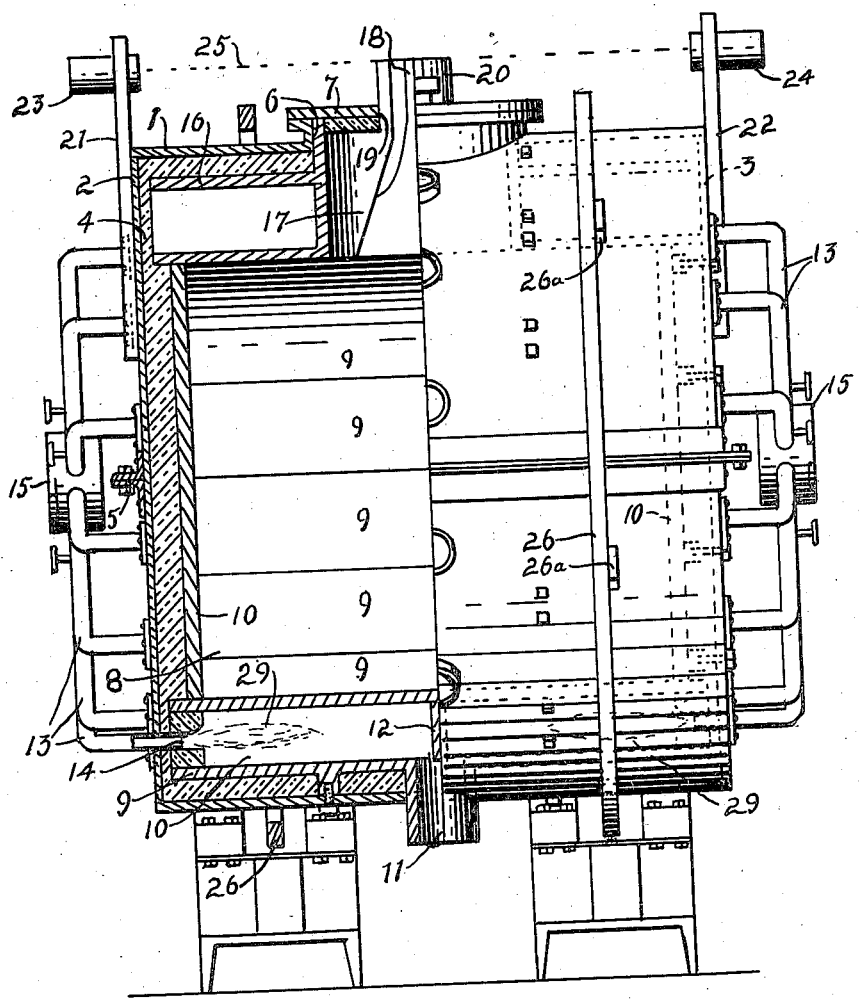
Figure 1 is a side elevational view of the furnace, partly in section.
Figure 2:
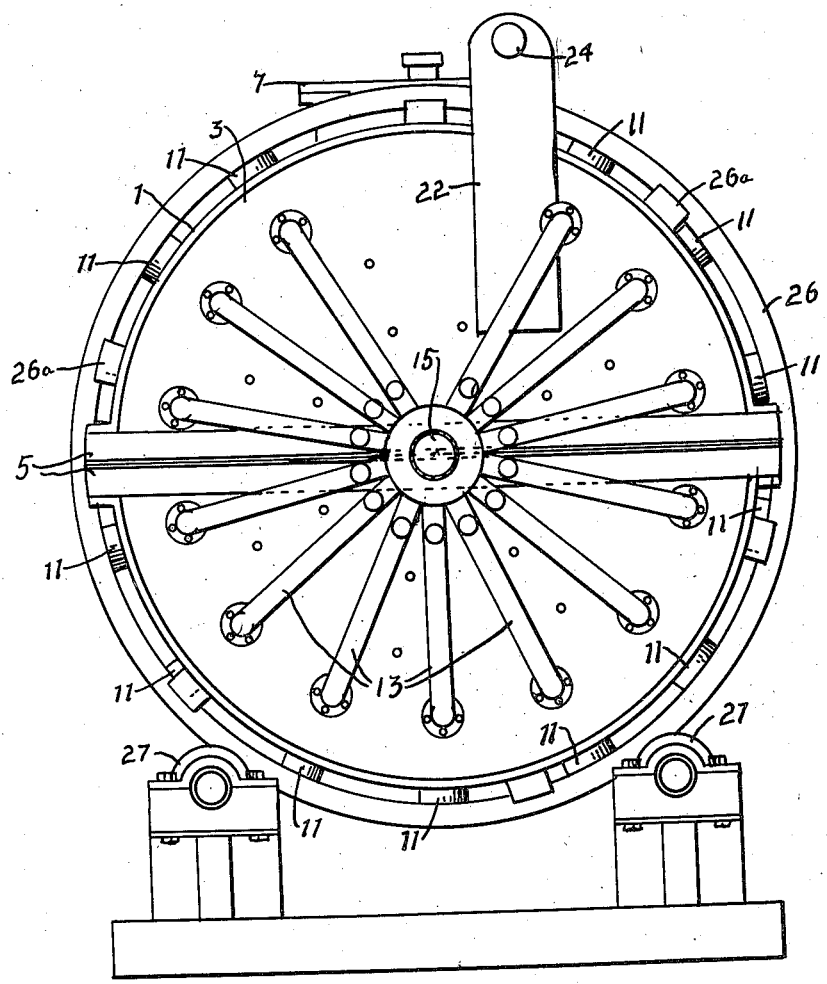
Figure 2 is an elevational view of one end of the furnace.
Figure 3:
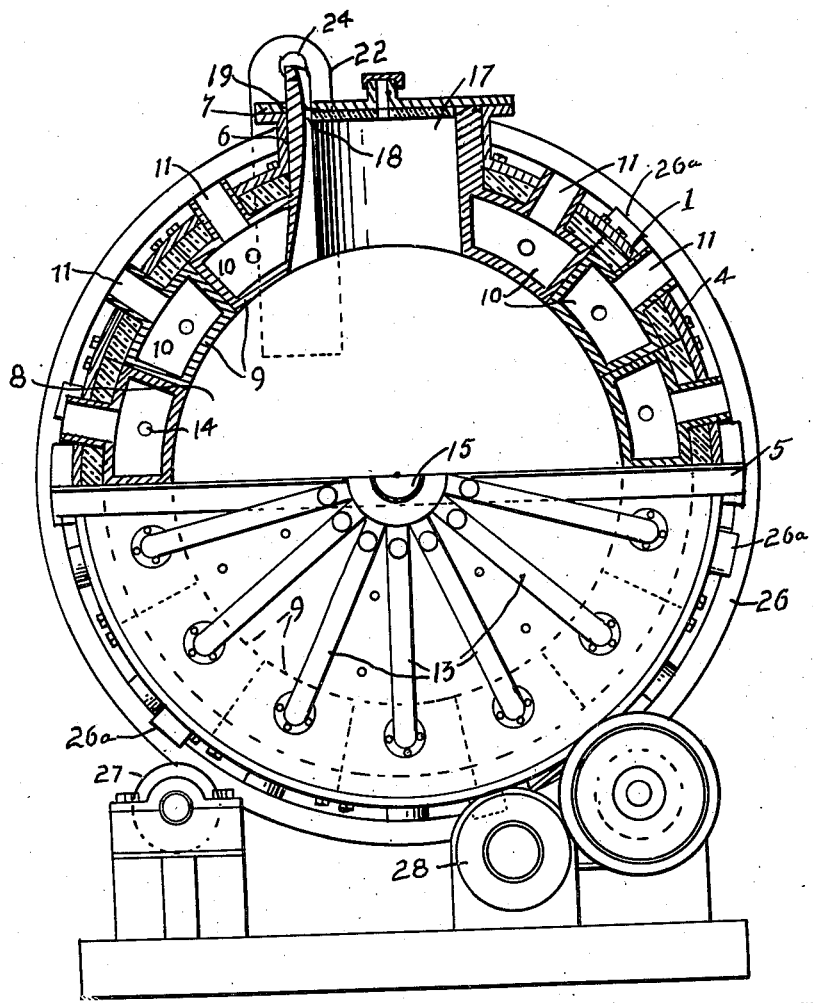
Figure 3 is an elevational view of the other end of the furnace, partly in section.

In the particular embodiment of the invention herein disclosed, I show at 1 a tubular shell with end closures as 2 and 3, the whole having an interior lining of insulating material as 4. The shell is formed of two similar parts joined on a longitudinal axial plane by means of flanges 5, one part having a feeding or charging opening formed therein as at 6 normally closed by a closure as 7.

On the inner side of the insulation lining 4, forming the wall of the melting chamber 8 and extending longitudinally thereof, are heating units 9, the ends of the chamber being lined with suitable plates as 10.

The heating units 9, except for the one including the pouring spout, are identical, and when in position form a perfectly smooth wall for the chamber 8. Each heating unit forms a combustion chamber 10 with an exhaust port 11 opening radially outward from its central portion, and having a baffle plate 12 in its center to direct the burnt gases outwardly through the exhaust as shown.

A pipe as 13 discharges fuel gas into each end of the chamber 10 as at 14, the several pipes being connected to a common source of supply through a distributing chamber 15.

The one unit 16 is formed to permit the introduction of metal to be melted into the melting chamber 8 as at 17 and is provided with a spout 18 extending beyond the end of the opening 17. The closure 7 is provided with a hole 19 fitting snugly over the spout 18, and during the melting operation the opening of the spout is closed with a plug as 20.

Arms as 21—22 are mounted on the opposite ends of the shell 1, and these arms are fitted with pins 23—24 that have their axes coinciding with the outer tip of the pouring spout as indicated at 25.

The shell 1 is provided with a pair of spaced rails as 26 concentric with the axis of the shell and mounted thereon by means of shoes 26a. The rails are seated on wheels as 27 which are rotated in any suitable manner as by motor 28.

Figure 4:
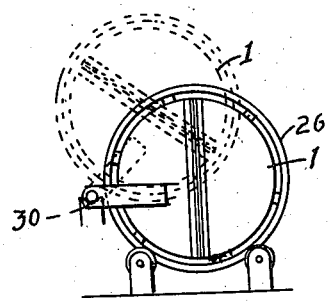
Figure 4 is a diagrammatical illustration of the positions assumed by the furnace when the metal is poured.

In use the material to be melted is placed within the melting chamber 8 through opening 17 and the closure is then securely bolted in place and a plug inserted in the projecting spout as described. The whole structure is then rotated or rocked on the supporting wheels 27 while the burning fuel at 29—29 heats the heating chambers and melts the material. When sufficient time has elapsed and the material is ready to be poured the structure is rotated until the pins 23—24 rest in sockets as 30 on any desired receiver such as a casting machine, and it is then lifted bodily and tilted on said pins as shown in Figure 4, allowing the melted material to flow readily therefrom, the plug of course having been removed from the spout.

In melting material, particularly magnesium, in a furnace of the character described, there is no heat loss and where materials of varying specific gravity are mixed to form an alloy a homogeneous mass is secured because they are thoroughly intermingled by the rocking of the chamber walls in which they are placed. Furthermore, the heat is uniformly distributed over the walls of the chamber and its continual rocking subjects all of the material, that at the top of the mass as well as that at the bottom, to the same melting temperature.

Having thus described my invention, what I claim as new and desire to secure by Letters Patent is:

1. A hollow cylindrical drum and means for imparting a rolling movement thereto, the inner cylindrical wall of said drum being formed of a series of juxtaposed heating units, each unit having a fuel discharge nozzle in each end and an exhaust leading outwardly from its center.

2. A hollow cylindrical drum and means for imparting a rolling or rocking movement thereto, the inner cylindrical wall of said drum being formed of a plurality of juxtaposed similar heating units, each unit having a fuel feed nozzle in each end, a baffle plate in the center, and an exhaust leading outwardly from its center to receive exhaust gases from both sides of the baffle plate.

3. A hollow cylindrical drum and means for rocking the same, the inner cylindrical wall of said drum being formed of juxtaposed hollow members to form a smooth inner wall, each hollow member forming a heating unit having a fuel nozzle discharging into each end and an exhaust for burnt gases extending radially from its center.

HENRY M. GRIFFOUL.